United States Patent [19]

Sanchez et al.

[11] 3,965,556

[45] June 29, 1976

[54] JACKET HOLDER

[75] Inventors: Fred M. Sanchez, San Jose, Calif.; Yukio Shirai; Toshiyuki Sakakibara, both of Kawasaki, Japan; Mitsuru Ohminato, Yokohama, Japan

[73] Assignee: Ricoh Co., Ltd., Tokyo, Japan

[22] Filed: Feb. 7, 1975

[21] Appl. No.: 548,023

[30] Foreign Application Priority Data

Feb. 8, 1974 Japan ................................ 49-16675

[52] U.S. Cl. .............................. 29/200 J; 29/208 R; 29/283; 53/23; 53/123; 53/246

[51] Int. Cl.² ........................................... B23P 19/00

[58] Field of Search ........... 29/200 R, 200 J, 208 R, 29/283, 200 P; 269/287, 321 W, 86; 53/244, 23, 123, 246; 156/290

[56] References Cited

UNITED STATES PATENTS

| | | | |
|---|---|---|---|
| 2,937,483 | 5/1960 | Engelstein | 53/123 |
| 3,457,697 | 7/1969 | Engelstein | 53/123 |
| 3,807,121 | 4/1974 | Mundt et al. | 53/23 |
| 3,872,645 | 3/1975 | Dorman | 53/123 |

*Primary Examiner*—Victor A. DiPalma
*Attorney, Agent, or Firm*—Cooper, Dunham, Clark, Griffin & Moran

[57] ABSTRACT

A jacket holder for holding a jacket wherein strips of microfilm are inserted into pockets formed in the jacket. The jacket holder comprises first and second plate members hinged with each other for holding the jacket therebetween. The first plate member includes a raised inclined surface portion at its one end portion with film strip inserting passageways formed beneath the raised portion and the second member includes a recessed inclined surface portion complementary to the raised portion. By means of the cooperating raised and recessed portions, the jacket held by the two members is bent at the portion where inlets for the pockets exist so that a film strip is easily inserted into the pocket through the passageway and the inlet. A system is also disclosed for automatically inserting film strips into the jacket pockets.

10 Claims, 8 Drawing Figures

JACKET HOLDER

BACKGROUND OF THE INVENTION

This invention relates to a jacket holder for holding a jacket to permit strips of film to be automatically inserted in the jacket.

A microfilm represents a duplication of an original produced by photography in a 16 mm or 35 mm film by reducing the size. It is well known that, by using a microfilm system, it is possible to arrange and store a massive amount of material in a very small space. When the microfilm is of the roll form type, difficulty is experienced in retrieving a film image unless the film is provided with some sort of index. However, retrieving of the desired film image can be facilitated if the film in roll form is cut into strips of film of predetermined length, e.g. about 10 to 30 cm, and such strips of film are stored in a jacket by providing the same with an index for each unit according to the content.

FIG. 1 shows one example of such a jacket. The jacket 1 comprises, in combination, a base B and a cover C which are either transparent or semi-transparent and joined either by bonding or melt fusion at essential portions. The jacket 1 includes an index column 2 and pockets 1-1, 1-2 . . . **1-*i* . . . 1-*l*, for strips of film which are disposed parallel to one another. Each pocket 1-*i*** has on the cover side an inlet *pi* which is formed in the vicinity of one end portion in the longitudinal direction of the pocket. As is known, the base B and cover C may be made of Acetate (trade name) or Mylar (Trade name). Particularly, by using Mylar, it is possible to reduce the thickness of the jacket to about 0.1 mm. When a film strip is stored in the jacket 1, the verification of the film image can be effected by using a reader for the jacket without removing the film strip 3 from the jacket. In this case, the film strip 3 is protected by the jacket 1, so that the jacket offers the advantage of eliminating damage to the film strip when verification of the film image is effected.

The strip of film 3 may be inserted in the jacket 1 either manually or automatically by using an inserting device.

In one method known in the art of automatically inserting the film strip 3 in the jacket 1, a guide G is mounted at an angle with respect to the longitudinal axis of the pocket 1-1 of the jacket 1, and the film strip 3 is supplied by a pair of delivery rollers R and moved through the guide G till the strip extends through the inlet *pi* of the pocket 1-1 and is forced against the base B as shown in FIG. 2. The neighborhood of the inlet *pi* of the pocket is opened by the force with which the end of the film strip 3 engages the base B, so that the film strip 3 upon bending can be inserted in the pocket 1-1. When this method is employed, it may not be possible to positively insert the film strip in the pocket if the strip tends to wind into a loop. Moreover, the strip of film must have a substantial firmness in order that the neighborhood of the inlet of the pocket be opened by the leading end of the strip of film.

SUMMARY OF THE INVENTION

This invention has as its object the provision of a jacket holder which permits the insertion of a strip of film into the jacket to be carried out readily and positively. According to the invention, there is provided a jacket holder comprising first and second members for holding a jacket of the previously mentioned type such that the jacket is bent at the portion where the inlets of the pockets exist so as to facilitate the insertion of film strips into the pockets through passageways formed in one of the members. This arrangement offers a reliable manner for the automatic insertion of film strip where it is desired.

DESCRIPTION OF A PREFERRED EMBODIMENT

Figure 1:
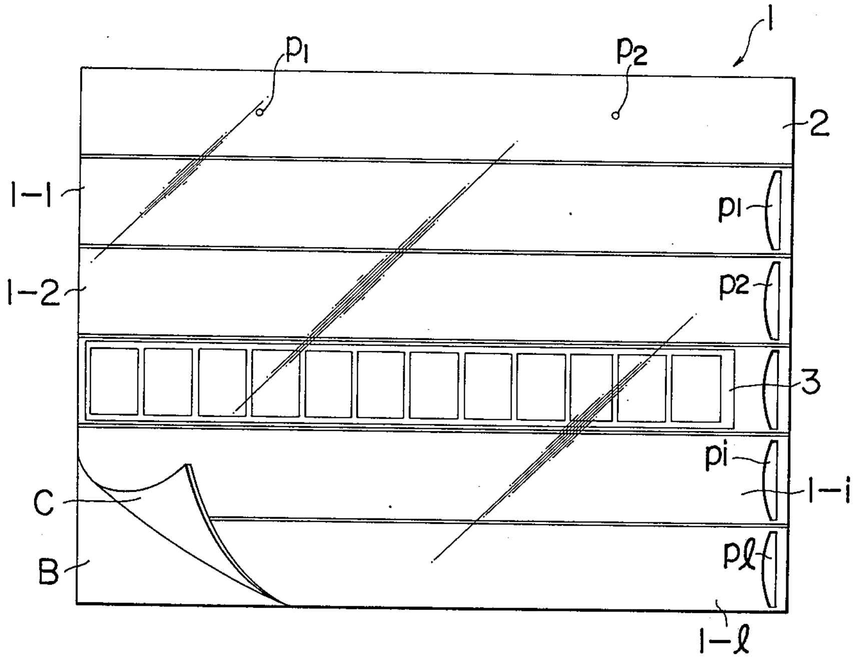
FIG. 1 is a plan view of one form of jacket adapted to be held by the jacket holder according to the invention and receiving film strips therein.
Figure 2:
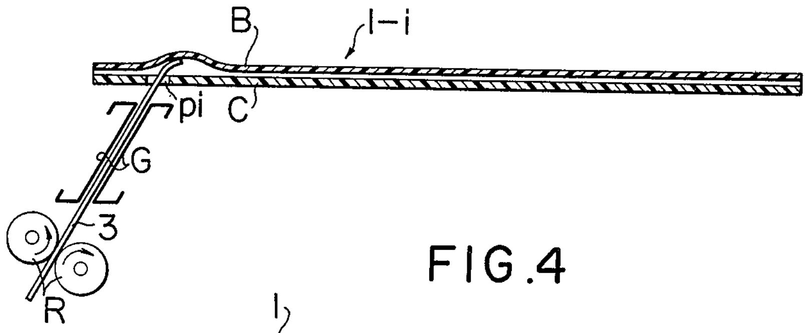
FIG. 2 (PRIOR ART)
FIG. 2 is a view in explanation of one process of the prior art for inserting a film strip in the jacket shown in FIG. 1.

The invention will now be described with reference to the embodiment shown in the drawings.

Figure 3:
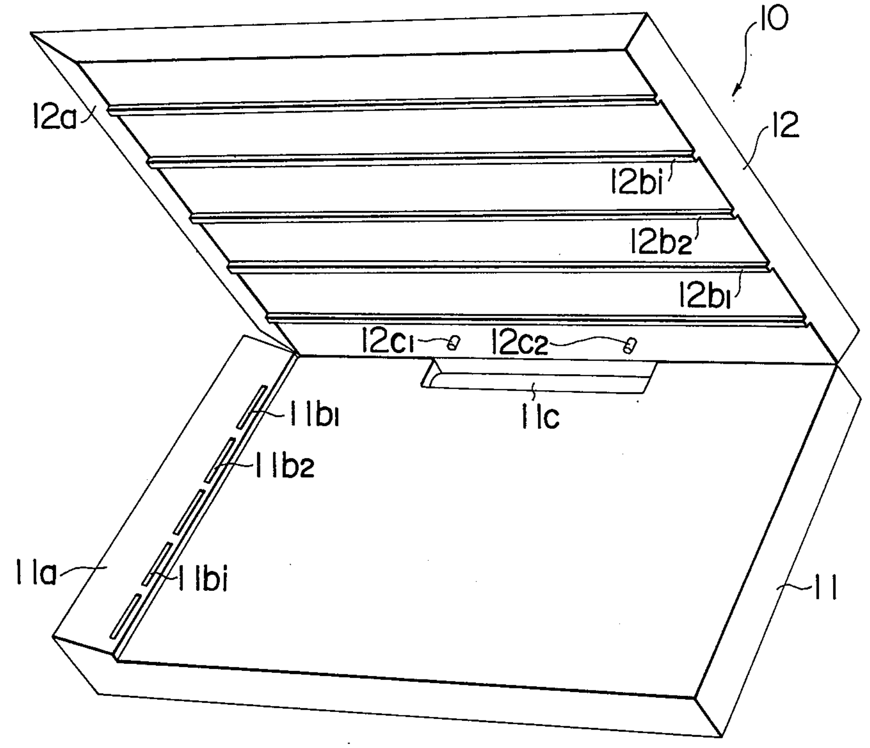
FIG. 3 is a perspective view of the jacket holder comprising one embodiment of the invention.

FIG. 3 shows one embodiment of the jacket holder embodying the invention.

More specifically, the jacket holder 10 comprises a main plate 11 and a subordinate plate 12 hingedly connected together to open and close freely. A raised inclined surface portion **11*a* which is nozzle-like in section is formed at one end portion of the main plate 11. Film strip inserting passageways 11*b*1, 11*b*2 . . . 11*bi* . . . are formed in the form of tunnels at the raised inclined surface portion 11*a*. The subordinate plate 12 is formed at its end portion with a recessed inclined surface portion 12*a* which is complementary to the raised inclined surface portion 11*a* of the main plate 11, and is also formed with ribs 12*b*1, 12*b*2 . . . 12*bi*** . . . .

Pins **12*c*1 and 12*c*2 are affixed to the subordinate plate 12 near the portion thereof at which the subordinate plate 12 is connected to the main plate 11. These pins 12*c*1 and 12*c*2 are received in a cutout 11*c* formed in the corresponding portion of the main plate 11** when the main plate and the subordinate plate are closed together.

Figure 4:
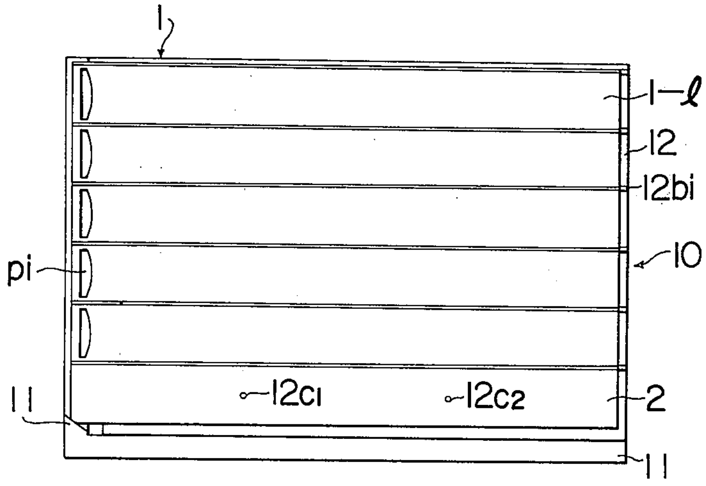
FIG. 4 is a front view of the jacket holder shown in FIG. 3, which jacket holder is opened to place a jacket therein.

The jacket holder 10 is charged with the jacket 1 as follows. Returning to FIG. 1, openings ***p*1 and *p*2 are formed in the index column 2 of the jacket 1 to correspond to the pins 12*c*1 and 12*c*2 affixed to the subordinate plate 12, and the pins 12*c*1 and 12*c*2 are received in these openings. At this time, the base B of the jacket 1 is placed on the subordinate plate 12 side. Thus, the jacket 1 is placed in the jacket holder 10 as shown in FIG. 4. The ribs 12*b*1, 12*b*2 . . . 12*b* provided in the subordinate plate 12 and disposed parallel to one another are positioned, on the side of the base B, against the marginal portions of the pockets 1-1, 1-2 . . . 1-*i*** . .

. of the jacket 1 or the portions of the jacket in which the base B and the cover C are connected by melt fusion.

Figure 5:
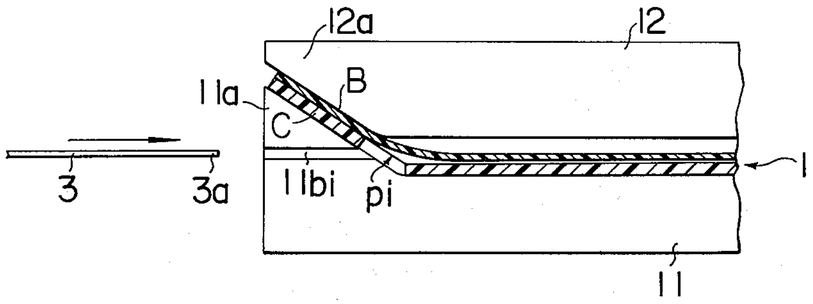
FIG. 5 is a view in explanation of the manner in which a strip film is inserted in the jacket held by the jacket holder shown in FIG. 3.

If the main plate 11 and the subordinate plate 12 are closed together to hold therebetween the jacket 1 which is set as shown in FIG. 4, then the inclined surface of the raised inclined surface 11*a* formed in the main plate 11 is positioned against the end portion of the cover C of the jacket 1, and this end portion is bent at the portion where the inlet *pi* of the pocket exists toward the base B, so that the bent end portion is held between the inclined surface of the raised inclined surface portion 11*a* and the inclined surface of the recessed inclined surface portion 12*a* as shown in FIG. 5. The ribs 12*b*1, 12*b*2 . . . 12*bi* . . . formed in the subordinate plate 12 force their corresponding portions tightly over the main plate 11. Flexing of the base B of the jacket at the portion of inlet *pi* of each pocket results in the base B being stripped from engagement with the cover C at the portion where the inlet *pi* exists, so that the inlet *pi* of the pocket is opened. As aforementioned, film strip inserting passageways 11*b*1, 11*b*2 . . . 11*bi* . . . are formed in the raised inclined surface portion 11*a* of the main plate to correspond to the pockets 1-1, 1-2 . . . 1-i . . . of the jacket 1 held by the jacket holder 10. These film strip inserting passageways 11*b*1, 11*b*2 . . . 11*bi* . . . are provided as shown in FIG. 5. More specifically, the film strip inserting passageway 11*bi* extends from the end surface of the main plate 11 at the raised inclined surface portion 11*a* side to the inclined surface side of the raised inclined surface portion 11a and disposed parallel to the pocket 1-1 of the jacket 1 held by the jacket holder 10. The end portion of the film strip inserting passageway 11*bi* at the inclined surface side of the raised inclined surface portion 11*a* corresponds in position to the portion of inlet *pi* of the pocket 1-1 of the held jacket 1. Thus, if the film strip 3 is inserted in the film strip inserting passageway 11*b*1, a leading end 3*a* of the film strip 3 will reach the portion where the inlet *pi* of the pocket 1-1 of the jacket 1 exists. Since the base B is separated from the cover C at the portion where the inlet *pi* exists and the inlet is opened as aforementioned, the film strip 3 can be smoothly inserted into the interior of the pocket 1-1 through the inlet *pi* as the film strip 3 is moved in the direction of the arrow.

Figure 6:
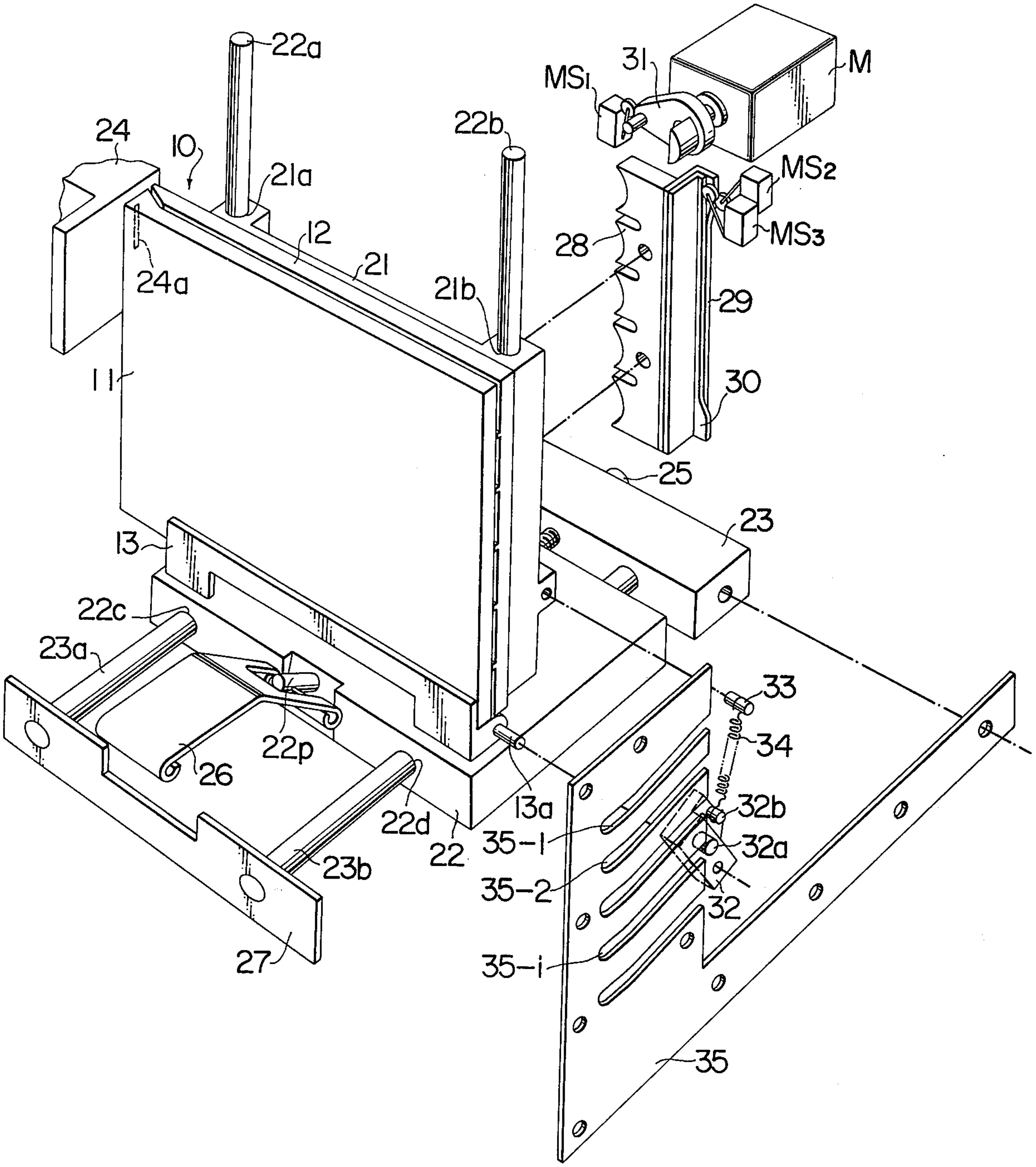
FIG. 6 is a perspective view showing one example of the use of the jacket holder according to the invention.

FIG. 6 shows an embodiment of the jacket holder according to the invention as incorporated in a processor camera. The subordinate plate 12 of the jacket holder 10 is secured to a vertical direction supporter 21, and the main plate 11 is connected to the subordinate plate 12 through a hinge 13 (the hinge 13 is not shown in FIG. 3 and FIG. 4) and rotates about the axis of a rotary shaft 13*a* on which the hinge 13 is fixed to open leftwardly in FIG. 6. The vertical direction supporter 21 is formed at opposite end portions with bores 21*a* and 21*b* which receive therein vertical shafts 22*a* and 22*b* respectively which are affixed at their lower ends to a transverse direction supporter 22 and disposed parallel to each other. Thus, the vertical direction supporter 21 is movable in a vertical direction parallel to the shafts 22*a* and 22*b*. The transverse direction supporter 22 is also formed at opposite end portions with bores 22*c* and 22*d* which receive therein shafts 23*a* and 23*b* respectively which are affixed to an immovable member 23 of the processor camera and disposed parallel to each other. Thus, the transverse direction supporter 23 is movable in a direction parallel to the shafts 23*a* and 23*b*. A film strip to be inserted in the jacket held by the jacket holder 10 is delivered through a film outlet 24*a* of a film inserting portion 24 of the main body of the processor camera. Accordingly, the entrance to the film strip inserting passageway 11*bi* disposed at the end surface of the raised surface side of the main plate 11 as shown in FIG. 5 is positioned against the film outlet 24*a* shown in FIG. 6. Their relative positions can be adjusted by means of a fine adjustment screw 25 connected to the immovable member 23. More specifically, the forward end of the fine adjustment screw 25 is positioned against the end surface of the transverse direction supporter 22 which faces the immovable member 23. By rotating the fine adjustment screw 25, it is possible to adjust the spacing between the immovable member 23 and the transverse direction supporter 22, thereby effecting adjustments of the relative positions of the film outlet 24*a* of the film inserting portion 24 which is fixed with respect to the immovable member 23 and the film strip inserting passageway 11*bi* (FIG. 5) of the jacket holder 10. Another supporter moving member 26 is connected to an end surface of the transverse direction supporter 22 opposite to the end surface which the immovable member 23 faces. More specifically, the supporter moving member 26 is mounted at one end portion thereof on a shaft 22*p* connected to the aforementioned end surface of the transverse direction supporter 22, so that the member 26 can move in pivotal motion about an axis perpendicular to the shaft 22*p*. The other end portion of the supporter moving member 26 is connected to an opening and closing port (not shown) for changing jackets of the processor camera device. If the opening and closing port for changing the jackets is opened, then the supporter moving member 26 moves leftwardly in FIG. 6, so that the transverse direction supporter 22 can be moved along the shafts 23*a* 23*b* toward a stopper 27.

A rack 28 for a Geneva gear for moving the vertical direction supporter 21 up and down is secured to a surface of the vertical direction suppoter 21 opposite to the surface to which the subordinate plate 12 of the jacket holder is secured to support the jacket holder 10 by the supporter 21. Together with the rack 28 for the Geneva gear, an upper limit plate 29 and a lower limit plate 30 for detecting the upper limit and lower limit of the up-and-down movement are secured to the vertical direction supporter 21. A Geneva gear 31 adapted to mesh with the rack 28 for the Geneva gear, a motor M for operating the Geneva gear 31, a microswitch MS1 for stopping the Geneva gear and microswitches MS2 and MS3 for detecting the upper limit and lower limit of the up-and-down movement of the vertical direction supporter 21 are provided and fixed relative to the transverse direction supporter 22. Thus, the movement of the transverse direction supporter 22 causes no change in their relative positions with respect to the rack 28 for the Geneva gear, upper limit plate 29 and lower limit plate 30.

Secured to the rotary shaft 13*a* of the holder hinge 13 is an arm 32 which has a pin 32*a* affixed to its end portion. A radial line connecting the center of rotation of the arm 32, or the axis of rotary shaft 13*a*, to the pin 32*a* is inclined at a certain angle toward the shaft 23*b*, rather than the shaft 22*b*, when the jacket holder 10 holds the jacket or it is in the position shown in FIG. 6. A pin 33 is affixed to the vertical direction supporter 21, and a tension spring 34 is mounted between the pin 33 and a pin 32*b* affixed to the free end portion of the arm 32, so that the arm 32 is urged by the biasing force of the spring 34 to move clockwise about the axis of the rotary shaft 13*a* to which it is secured. This tendency of the arm 32 to move clockwise forces the main plate 11 tightly against the subordinate plate 12 through the rotary shaft 13*a*.

Figure 7:
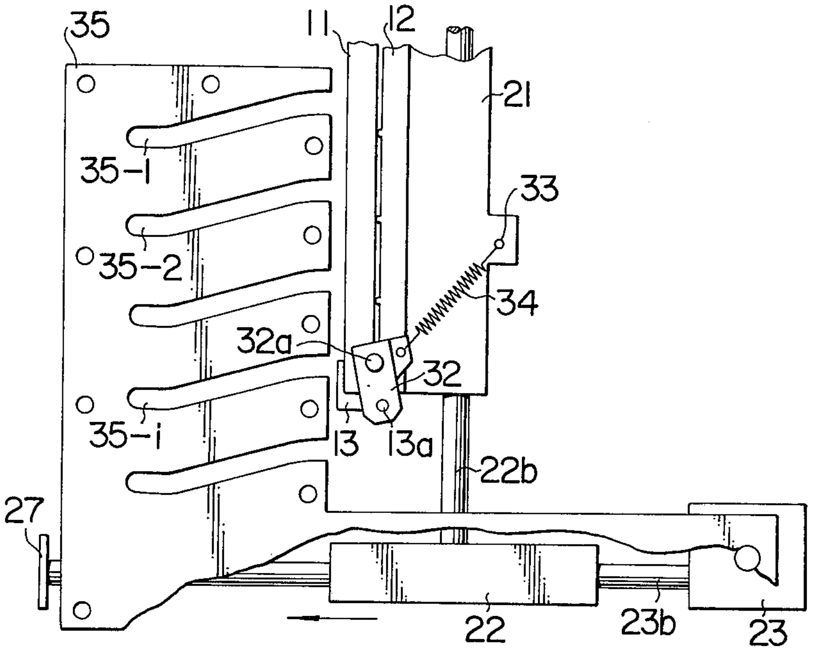
FIG. 7 is a side view showing the relative positions of the holder opening and closing member and the jacket holder in the example of use shown in FIG. 6.
Figure 8:
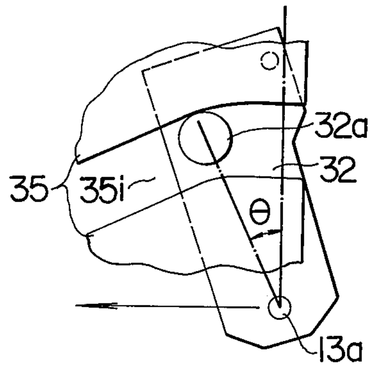
FIG. 8 is a view in explanation of the mechanism of opening and closing the jacket holder by the holder opening and closing member.

A holder opening and closing member 35 for opening and closing the jacket holder is secured to the immovable member 23 and other fixed parts of the device (not shown). The relative positions of the holder opening and closing member 35 and the jacket holder 10 may be as shown in FIG. 7. The holder opening and closing member 35 is formed therein with cutouts 35-1, 35-2 . . . 35-*i* . . . which are equal in number to the pockets of the jacket held by the jacket holder 10. The cutouts 35-1, 35-2 . . . 35-*i* . . . are directed downwardly in going from right to left in FIG. 7. If the opening and closing port (not shown) for changing the jackets of the processor camera device is opened with the parts in the state shown in FIG. 7, the transverse direction supporter 22 is moved in the direction of the arrow or leftwardly in FIG. 7 by the supporter moving member 26 (See FIG. 6) connected to the opening and closing port as aforementioned. This brings the pin 32*a* affixed to the arm 32 into the cutout 35- *i* of the holder opening and closing member 35. However, as the transverse direction supporter 22 moves further leftwardly, the pin 32*a* is brought into engagement with the upper portion of the cutout 35-*i* as shown in FIG. 8 because the cutout is directed downwardly. Thus, as the leftward movement of the transverse direction supporter progresses in FIG. 8, a downwardly directed force is exerted on the pin 32*a*. However, as aforementioned, the direction of a radial line from the axis of rotation of the rotary shaft 13*a*, or center of rotation of the arm 32, to the pin 32*a* forms a certain angle (Θ) with a direction which is perpendicular to the direction of movement of the transverse direction supporter 22. Therefore, as the transverse direction supporter 22 further moves leftwardly, the arm 32 is moved counterclockwise by the downwardly directed force exerted on the pin 32*a*. Since the arm 32 is secured to the rotary shaft 13*a* as aforementioned, the counterclockwise rotation of the arm 32 causes the rotary shaft 13*a* to rotate, and the rotation of the rotary shaft 13*a* causes the main plate 11 to move counterclockwise in FIG. 7, so that the jacket holder 10 is opened. The jacket holder 10 can be charged with a jacket as aforementioned. After the jacket holder 10 is charged with a jacket and the holder closed, the relative positions of the film strip inserting passageway 11*bi* (See FIG. 5) of the jacket holder 10 and the film outlet 24*a* of the film inserting portion 24 of the main body of the processor camera are adjusted by operating the fine adjustment screw 25 shown in FIG. 6, and the processor camera device is actuated. A film in roll form is mounted in the processor camera device. After a process including the developing of the film is completed within the device, the film is cut into a film strip of a predetermined length by a cutter (not shown), and the film strip is pushed out by the cut end portion of the film in roll form through the film outlet 24*a*, so that the film strip is inserted as aforementioned in a pocket of the jacket held by the jacket holder 10. At this time, air may be blown into the pocket from an end thereof opposite to the end with inlet *pi* in order to facilitate such insertion when required to do so. When the jacket holder 10 is disposed in a position shown in FIG. 6 or in the lowermost position relative to the transverse direction supporter 22, the lowermost pocket 1-*l* (See FIG. 4 too) of the jacket 1 shown in FIG. 1 receives the film strip therein. Upon completion of insertion of the film strip in the pocket 1-*l*, the film in roll form which has pushed and moved the film strip returns to the predetermined position in the processor camera again, and a signal is supplied to the motor M for moving the jacket holder 10 upwardly a distance corresponding to the width of a pocket. This signal actuates the motor M which causes the Geneva gear 31 to rotate counterclockwise. Thus, the vertical direction supporter 21 and hence the jacket holder 10 is moved to a predetermined position by the rack 28 for the Geneva gear which is secured to the vertical direction supporter 21, while the Geneva gear 31 makes one complete revolution. The Geneva gear 31 has an end portion which acts as a cam for actuating the microswitch MS1. Thus, the motor M is de-actuated by the microswitch MS1 when the Geneva gear is restored to its original position after making one complete revolution. This brings the new film inserting passageway of the jacket holder 10 into index with the film outlet 24*a*. This process is repeated so that film strips are successively inserted in the pockets formed in the jacket. And the jacket holder 10 is gradually moved upwardly till a projection of the lower limit plate 30 secured to the vertical direction supporter 21 for telling the lower limit of the vertical direction supporter actuates the microswitch MS3. Actuation of the microswitch MS3 produces a signal for completion of insertion of film strips in the jacket. Accordingly, if the opening and closing port of the processor camera device for changing the jackets is opened at this state, the jacket holder 10 can be opened as aforementioned and the jackets can be changed. At this time, the pin 32*a* of the arm 32 is engaged in the uppermost cutout 35-1 of the holder opening and closing member. Thus, if a new jacket is placed in the jacket holder 10 as shown in FIG. 4 and then the opening and closing port for changing the jackets is closed, the transverse direction supporter 22 is pushed back and the main plate 11 of the jacket holder 10 is closed by the biasing force of the spring 34, so that the new jacket is held between the main plate 11 and the subordinate plate 12. If the processor camera is actuated again, then a signal is first supplied to the motor M to actuate the same to cause the Geneva gear 31 to rotate clockwise, so that the jacket holder 10 is moved downwardly by the rack 28 for the Geneva gear 31 until the limit plate 29 actuates the microswitch MS2. Actuation of the microswitch MS2 de-actuates the motor M and at the same time supplies a signal to the main motor of the processor camera device, so that the aforementioned process is repeated. From the foregoing description, it will be appreciated that the present invention provides a jacket holder which permits film strips to be readily and positively inserted in the jacket. In this specification, the directional terms upwardly and downwardly are employed for convenience sake, but it is to be understood that the invention is not limited to these directions.

What is claimed is:

1. A jacket holder for holding a jacket to permit strips of film to be inserted therein, said jacket being of the type comprising, in combination, a base and a cover each made of pliable material and forming therebetween one or more pockets for storing strips of film therein, said pockets being disposed parallel to each other and each having an inlet for the film formed on the cover side and in the vicinity of one end portion in the longitudinal direction of the pocket, said jacket holder comprising: first and second members; spacing means for holding said jacket between said first and second members such that a space is maintained therebetween sufficient to permit a strip of film to be inserted into the pocket of the jacket held thereby with the cover disposed adjacent the first member; said first member including a raised inclined surface portion formed at the end portion thereof on the side corresponding to the inlets of said pockets and adapted to push and bend said jacket at the portion where the inlets exist toward said base when the jacket is held between the first and second members; said second member including a recessed inclined surface portion cooperating with said raised inclined surface portion when holding the jacket; and said first member including film strip inserting passageways formed at the end portion thereof on the side on which said raised inclined surface is provided and extending through the raised inclined surface portion parallel to and in alignment with the pockets of said jacket when held by the first and second members.

2. A jacket holder as in claim 1 wherein said spacing means is on said second member and includes ribs adapted to force the marginal portions of said pockets extending in the longitudinal direction of the pockets against said first member when the jacket is held by the first and second members.

3. A jacket holder as in claim 1 wherein said first and second members are hinged with each other.

4. A system for automatically inserting film strips in a jacket of the type comprising a base layer and a cover layer of pliable material having formed therebetween one or more pockets for storing strips of film, said pockets being disposed parallel to each other and each having an inlet formed in the cover layer near one end in the longitudinal direction, said system comprising:

a jacket holder comprising:

first and second members;

spacing means for holding said jacket between said first and second members such that a space is maintained therebetween sufficient to permit a strip of film to be inserted into a pocket of the jacket held thereby and with the cover layer disposed adjacent to the first member;

said first member including a raised inclined surface portion formed at the end portion thereof on the side corresponding to the inlets of said pockets and adapted to push and bend said jacket at the portion where the inlets exist toward said base layer when the jacket is held between the first and second members;

said second member including a recessed inclined surface portion cooperating with said raised inclined surface portion when holding the jacket; and said first member including film strip inserting passageways formed at the end portion thereof on the side on which said raised inclined surface is provided and extending through the raised inclined surface portion parallel to and in alignment with the pockets of said jacket when held by the first and second members; means for feeding film strips to said jacket; means for supporting said jacket holder; and means for moving said supporting means to align the passageways in said holder with the film strips fed by said feeding means.

5. A system as in claim 4 wherein said moving means comprises a Geneva gear and said supporting means comprises a rack cooperating with said Geneva gear to produce linear movement of said jacket holder past said feeding means.

6. A system as in claim 5 wherein said rack further comprises limit plates disposed at either end for indicating the limits of rack movement.

7. A system as in claim 4 further comprising hinge means for connecting said first and second members of said jacket holder and means for opening said jacket holder about said hinge means while on said supporting means.

8. A system as in claim 7 wherein said opening means comprises an arm member fixed to said hinge means for rotation therewith; spring means for urging said arm member toward said supporting means; a pin member on said arm member; and guide means disposed adjacent said supporting means for cooperating with said pin member upon the movement of said supporting means to rotate said arm member against the action of said spring means.

9. A system as in claim 8 wherein said guide means comprises a plate member having a series of cutouts therein for accommodating and guiding said pin member.

10. A system as in claim 4 wherein said supporting means comprises a vertical support member and a transverse support member and a vertical shaft and a transverse shaft, the vertical support member and transverse support member being respectively mounted on said vertical shaft and transverse shaft for movement therealong.

* * * * *